United States Patent [19]

Yamada et al.

[11] Patent Number: 4,571,140
[45] Date of Patent: Feb. 18, 1986

[54] EXTRACTING DEVICE FOR EXTRACTING CONTENTS FROM BAG-LIKE CONTAINER

[75] Inventors: Sadami Yamada; Kaoru Tamura, both of Kanagawa, Japan

[73] Assignee: Fuji Photo Film Co., Ltd., Kanagawa, Japan

[21] Appl. No.: 668,883

[22] Filed: Nov. 6, 1984

[30] Foreign Application Priority Data

Nov. 9, 1983 [JP] Japan .................................. 58-210531

[51] Int. Cl.⁴ ............................................. B65G 65/00
[52] U.S. Cl. ...................................... 414/412; 414/411
[58] Field of Search ......................... 414/403, 411, 412

[56] References Cited

U.S. PATENT DOCUMENTS 2,803,361  8/1957  Edwards .............................. 414/412
3,934,150  1/1976  Matsumoto et al. ................. 414/412

Primary Examiner—Robert G. Sheridan
Attorney, Agent, or Firm—Murray, Whisenhunt & Ferguson

[57] ABSTRACT

A flexible bag-like container holding contents is placed on a setting table. The setting table is provided with an extracting gear and is movable with respect to a housing between a bag placing position and an extracting position. The housing is provided with an extracting gear which is adapted to be engaged with the extracting gear of the setting table when the setting table is moved to the extracting position. Said flexible bag-like container is placed on the setting table when the table is in the bag placing position, and the setting table is moved to the extracting position with the bag thereon so that a portion of the bag near one end thereof is pinched between the extracting gears. A portion of the bag near the other end is severed in response to the movement of the setting table to the extracting position, and then the extracting gears are rotated to move the bag away from the contents.

4 Claims, 10 Drawing Figures

EXTRACTING DEVICE FOR EXTRACTING CONTENTS FROM BAG-LIKE CONTAINER

BACKGROUND OF THE INVENTION

1. Field of the Invention

This invention relates to an extracting device for extracting contents from a bag-like container, and more particularly to such an extracting device for extracting contents from a flexible bag-like container.

2. Description of the Prior Art

An extracting device for extracting contents from a bag-like container is used in, for instance, an automatic loading system for automatically loading film such as X-ray film into a film magazine or a film cassette in a light room.

A typical extracting device for an automatic film loading system is disclosed in Japanese Unexamined Patent Publication No. 54(1979)-143227. In the extracting device, a light shielding bag accommodating therein X-ray film is supported in a predetermined position in a light-shielded chamber and the bag is severed between an end of the bag and the end of the film adjacent to the end of the bag. Then, a pair of nip rollers sandwiching therebetween the other end of the bag are rotated, with the contents of the bag, i.e. the film, being held, to move the bag so that the film is extracted therefrom through the opening formed by severing said end. The extracted film is then supplied to a film magazine or a film cassette.

This known extracting device is disadvantageous in that the structure is complicated since there are required a mechanism for pressing the nip rollers against each other so that a nipping pressure sufficient to move the bag away from the contents thereof is generated between the nip rollers, and a roller moving mechanism for moving the nip rollers away from each other in order to prepare for the next loading.

In Japanese Unexamined Utility Model Publication No. 56(1981)-5140, there is proposed an extracting device in which there is no need for a special roller moving mechanism. In the extracting device, one of the nip rollers is mounted on a setting table for placing a bag containing film, and the other nip roller is mounted on a housing of a film loading system, the setting table and the housing of the film loading system being arranged to form a light-shielded chamber and to bring the nip rollers into opposed relation when the housing is closed over the setting table. However, this extracting device is disadvantageous in that the setting table and the housing must be pressed against each other with a large force thereby adversely affecting the operation efficiency, since the film bag is formed by laminating aluminum foil and other materials for the purpose of providing light-shielding properties and humidity resistance to the film bag and therefore has rigidity to such an extent that the nip rollers must exert large nipping pressure to remove the bag from the contents thereof.

SUMMARY OF THE INVENTION

In view of the foregoing observations and description, the primary object of the present invention is to provide an improved extracting device for extracting contents of a bag-like container which is free from the drawbacks inherent to the extracting devices in accordance with the prior art described above, and has high operation efficiency, and at the same time is simple in structure.

In accordance with the present invention, a first extracting gear is mounted on a setting table for placing thereon a bag-like container. The setting table is movable with respect to a housing between a bag placing position in which the bag-like container is placed thereon, and an extracting position in which the contents of the container are extracted. When the setting table is in the extracting position, the setting table and the housing form a light-shielded chamber. On the housing is mounted a second extracting gear which is adapted to be engaged with the first extracting gear with a portion of the bag-like container near one end thereof intervening therebetween when the setting table is moved to the extracting position. By rotating the extracting gears with the portion of the container intervening therebetween, the bag is removed from the contents thereof.

DESCRIPTION OF THE PREFERRED EMBODIMENT

Figure 6:
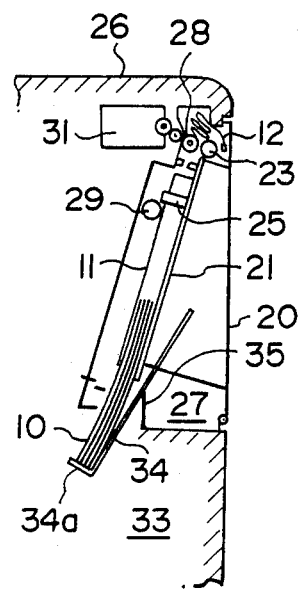
Figure 7:
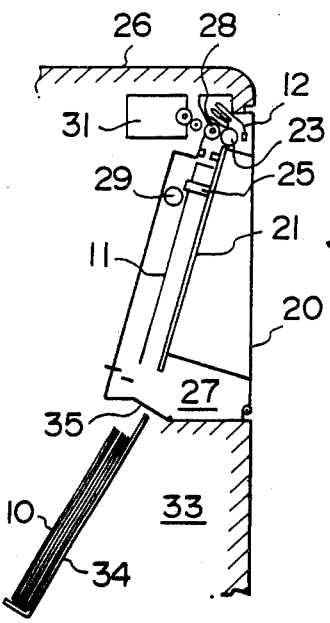
Figure 8:
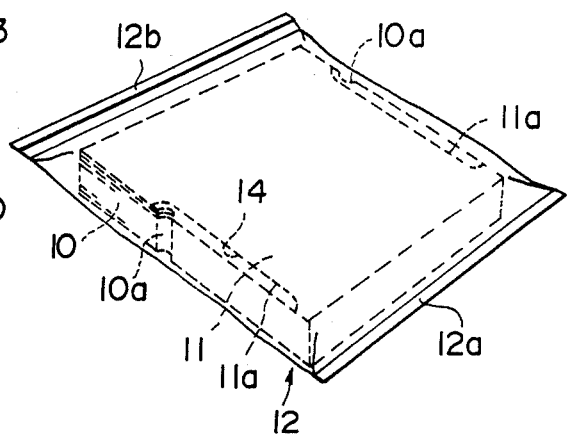
FIG. 8 is a perspective view of a bag to be handled by the extracting device of the embodiment.

FIGS. 1 to 7 are schematic views illustrating the operation of a film loading system employing an extracting device in accordance with an embodiment of the present invention. As shown in FIG. 8, a plurality of unexposed film (e.g. X-ray film) sheets 10 to be loaded by the film loading system shown in FIGS. 1 to 7 are stacked between the upper leaf and the lower leaf of a backboard member 11 formed by folding board material. The unexposed film sheets 10 together with the backboard member 11 are accommodated in a light-shielding flexible bag 12 formed of a laminated sheet material consisting of aluminum foil and polyethylene sheet. A pair of elongated notches 11a are formed on respective side edges of the backboard member 11, and a pair of small notches 10a are formed on respective side edges of each film sheet 10 so that the small notches 10a of the film sheets 10 are positioned in the elongated notches 11a of the backboard member 11 when the stack of the film sheets 10 are accommodated between the upper leaf and the lower leaf of the backboard member 11.

Figure 1:
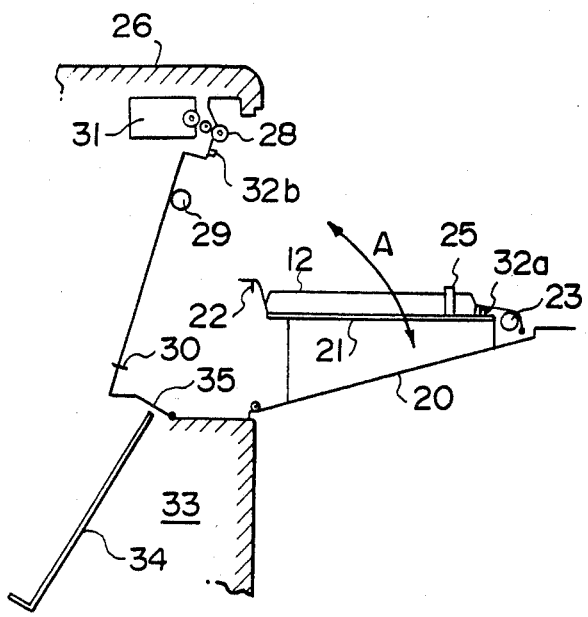
FIGS. 1 to 7 are schematic views illustrating the operation of a film loading system employing an extracting device in accordance with an embodiment of the present invention.
Figure 9:
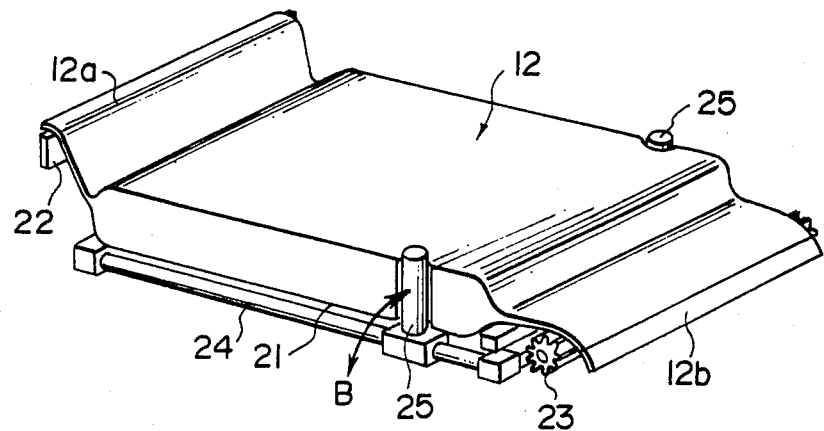
FIG. 9 is a fragmentary enlarged perspective view of the extracting device of the embodiment.

When film is loaded, a light shielding lid 20 of the system is first opened as shown in FIG. 1, and the bag 12 with the film sheets 10 therein is placed on a flat setting table 21 fixed to the inner face of the light shielding lid 20. The setting table 21 is provided with a cutter receiving groove 22 formed along one end thereof and a first extracting gear 23 extending along the other end thereof (FIG. 9). The bag 12 is placed on the setting table 21 so that a portion 12a near one end (This end will be referred to as the first end hereinbelow.) of the bag 12 lies above the cutter receiving groove 22 over the entire width thereof and a portion near the other end (This end will be referred to as the second end, hereinbelow.) of the bag 12 lies on the first extracting gear 23. A pair of rods 24 extend along respective side edges 24, and a pair of holders 25 are supported on the respective rods 24 for rotation in the direction of the arrow B in FIG. 9 and for sliding movement along the rods 24. When the bag 12 is placed on the setting table 21, the holders 25 are brought into the upright position shown in FIG. 9 by a driving device to be engaged with the notches 10a and 11a respectively formed in the film sheets 10 and the backboard member 11 over the bag 12, thereby positioning the bag 12, the film sheets 10 and the backboard member 11 on the setting table 21.

Figure 2:
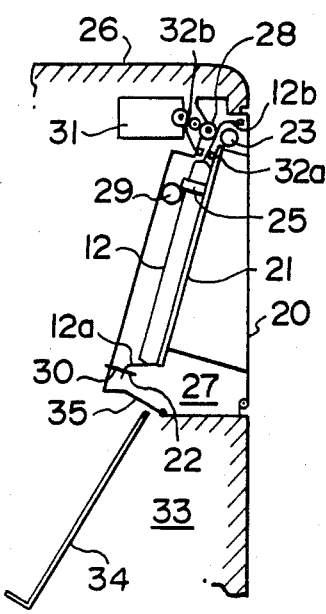
Figure 3:
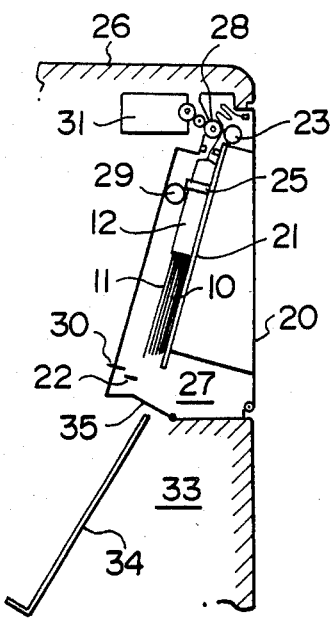

When the light shielding lid 20 is subsequently closed, a film loading chamber 27 shielded from ambient light is formed by the setting table 21 and a housing 26 of the system as shown in FIG. 2. The housing 26 is provided with a second extracting gear 28 extending in parallel to the first extracting gear 23 on the setting table. When the light shielding lid 20 is closed the first and second extracting gears 23 and 28 are brought into mesh with each other with the portion 12b of the bag 12 near the second end thereof intervening therebetween.

Further, the housing 26 is provided with a pressure roll 29 for flattening the film sheets 10 against the setting table 21 so that the film sheet 10 can be supported and fixed by the holders 25 even if the film sheets 10 curl.

After the light shielding lid 20 is thus closed, a cutter 30 is moved along the cutter receiving groove 22 in the housing 26 to sever the bag 12 along the portion 12a near the first end thereof.

Figure 10:
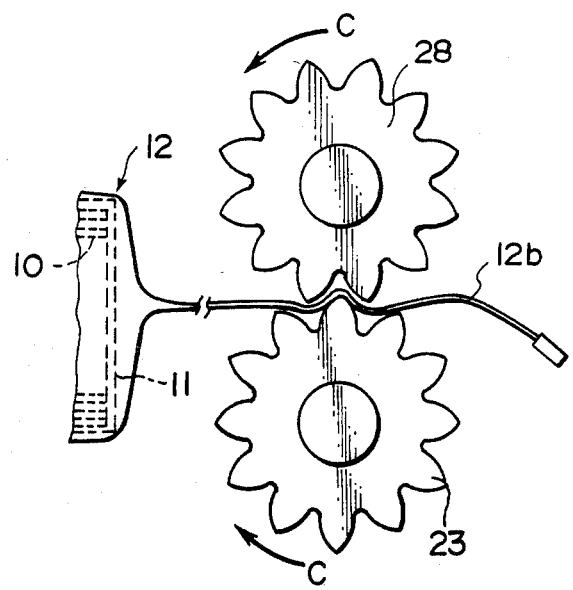
FIG. 10 is a fragmentary enlarged side view of the extracting device of the embodiment.

Then a gear driving device 31 is actuated to rotate the first and second extracting gears 23 and 28 in the direction of the arrows C in FIG. 10, and the bag 12 is moved rightward as seen in FIG. 10 away from the film sheets 10. At this time, the film sheets 10 in the bag 12 are fixedly supported on the setting table 21 by virtue of the holders 25 and the pressure roll 29, and are held by stoppers 32a and 32b which are adapted to pinch, when the light shielding lid 20 is closed, the bag 12 at a portion between the portion 12b sandwiched by the extracting gears 23 and 28 and the end of the film sheets 10 adjacent to the portion 12b. Therefore, the film sheets 10 cannot be moved together with the bag 12, thereby permitting the bag 12 to be moved away from the film sheets 10 by rotating the extracting gears 23 and 28.

Since the bag 12 is formed of a composite material comprising aluminum foil and the like and therefore has rigidity to some extent, a large drawing force must be applied to the bag 12 in order to remove it from the film sheets 10. In the prior art extracting device in which the drawing force for removing the bag from the film sheets is exerted by a pair of nip rollers respectively carried by the light shielding lid and the housing, the light shielding lid must be pressed against the housing at a high pressure in order to obtain sufficient drawing force by the nip rollers. However, in accordance with this embodiment in which the bag 12 is drawn away from the film sheets 10 by means of extracting gears 23 and 28, a sufficient drawing force can be easily obtained since the extracting gears bite into the bag 12 and therefore there is no need to press the light shielding lid 20 against the housing 26 at a high pressure.

Figure 4:
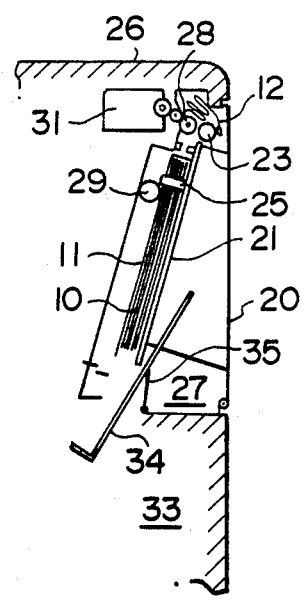
Figure 5:
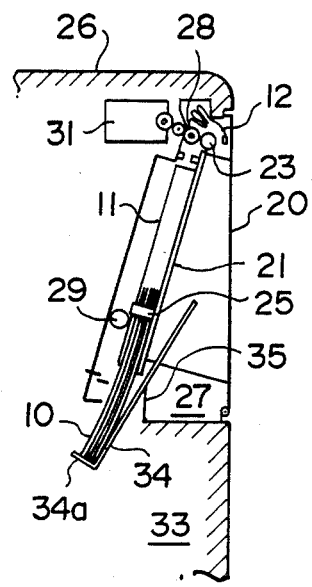

After the bag 12 is thus removed from the film sheets 10 and the backboard member 11, a tray 34 movably disposed in a film chamber 33 in which the film sheets 10 are to be loaded is moved upwardly into the film loading chamber 27 raising a shutter 35 between the film chamber 33 and the film loading chamber 27 as shown in FIG. 4.

Then, the holders 25 engaged with the small notches 10a of the film sheets 10 are slid downwardly along the rods 24 together with the pressure roll 29 driven by the driving device (not shown) to push the film sheets 10 until the lower ends of the film sheets 10 abut against a bottom flange 34a of the tray 34. Since the holders 25 move in the elongated notches 11a of the backboard member 11 at this time, the backboard member 11 cannot be pushed together with the film sheets 10 and only the film sheets 10 are pushed into the tray 34.

Thereafter, the holders 25 are swung outwardly to the horizontal position as seen in FIG. 9, and the holders 25 and the pressure roll 29 are moved upwardly to the original position as shown in FIG. 6. Then the tray 34 is returned to the original position in the film chamber 33 to permit the shutter 35 to be closed again as shown in FIG. 7, thereby completing the loading operation.

The loaded film sheets 10 may be fed to the next step by known means such as a vacuum sheeting device.

On the other hand, the cut-off portion of the bag 12 and the bag 12 removed from the film sheets 10 are removed from the film loading chamber 27 after the film loading is completed and before the next film loading operation, with the backboard member 11 being removed simultaneously.

The present invention is not limited to the above described embodiment and contains modifications which a skilled in the art can modify the embodiment based on the description and his technical knowledge.

Though in the embodiment described above, the bag 12 is initially sealed at both ends thereof and is cut along the first end 12a prior to removal from the film sheets 10, the bag may be of a type which is not sealed at one end in advance and is folded at the end to make the end light-shielded. Further, though the extracting gears 23 and 28 are driven by the gear driving device 31 in the above embodiment, the extracting gears 23 and 28 may be manually driven.

Though the lengths of the extracting gears 23 and 28 are substantially equal to the width of the bag 12 in the above embodiment, the extracting gears 23 and 28 may be shorter than the width of the bag 12 so that they nip only a part of the bag 12, or a plurality of pairs of extracting gears may be provided to nip the bag 12 at a plurality of positions arranged in a row in the direction of the width of the bag 12. Furthermore, a plurality of pairs of extracting gears, each having a length substantially equal to the width of the bag may be provided, if desired. Further, the present invention can be applied to any extracting device for extracting contents from a flexible bag-like container and is not limited to those for use in a film loading system or to those for extracting film sheets accommodated together with a backboard member in a flexible bag.

We claim:

1. An extracting device for extracting contents from a flexible bag-like container comprising a setting table movable between a bag placing position in which said flexible bag-like container is placed on the setting table and an extracting position in which the bag-like container is removed from the contents therein, drawing means for drawing the bag-like container away from the contents, and a housing with respect to which the setting table is moved between the bag placing position and the extracting position, the setting table and the housing forming a light-shielded chamber when the setting table is in the extracting position, the drawing means consisting of first and second members respectively carried by the setting table and the housing so that the first and second members are opposed to each other with a portion of the bag-like container near one end thereof intervening therebetween to associate with each other to draw the bag-like container from the contents thereof when the setting table is moved to the extracting position, wherein the improvement comprises that the first and second members are at least a pair of drivable gears which are meshed with each other with the portion of the bag-like container intervening therebetween.

2. An extracting device as defined in claim 1 in which said drivable gears are driven by a driving device.

3. An extracting device as defined in claim 1 in which said bag-like container is a light shielding bag accommodating therein photosensitive film.

4. An extracting device as defined in claim 1 in which said extracting gears extend substantially over the entire width of the bag-like container.

* * * * *